(12) United States Patent
Budic et al.

(10) Patent No.: US 8,035,042 B2
(45) Date of Patent: Oct. 11, 2011

(54) VEHICLE SCALE COUPLING DEVICE

(75) Inventors: Jeff Budic, Delaware, OH (US); Aaron Skidmore, Columbus, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 380 days.

(21) Appl. No.: 12/411,160

(22) Filed: Mar. 25, 2009

(65) Prior Publication Data

US 2010/0243338 A1 Sep. 30, 2010

(51) Int. Cl.
*G01G 19/02* (2006.01)
*G01G 21/28* (2006.01)
*G01G 21/22* (2006.01)

(52) U.S. Cl. ......... 177/126; 177/132; 177/133; 177/134
(58) Field of Classification Search .................. 177/126, 177/127, 132–135
See application file for complete search history.

(56) References Cited

U.S. PATENT DOCUMENTS

| 3,272,269 | A | | 9/1966 | Murphy |
| 4,266,624 | A | | 5/1981 | Nordstron et al. |
| 4,281,728 | A | * | 8/1981 | Dickason et al. ............. 177/134 |
| 4,828,055 | A | | 5/1989 | Hamilton et al. |
| 5,446,248 | A | | 8/1995 | Strasser |
| 6,706,976 | B1 | * | 3/2004 | Schuler .......................... 177/126 |
| 6,756,547 | B2 | * | 6/2004 | Lefler ............................ 177/141 |
| 6,822,172 | B2 | | 11/2004 | Rice et al. |

FOREIGN PATENT DOCUMENTS

| EP | 1788260 A1 | 5/2007 |
| FR | 2576335 A1 | 7/1986 |

* cited by examiner

*Primary Examiner* — Randy W Gibson
(74) *Attorney, Agent, or Firm* — Standley Law Group LLP

(57) ABSTRACT

A coupling device designed to securely connect adjacent weigh platform modules of a vehicle scale. Such a device may include corresponding coupling elements, each adapted for attachment to a respective one of a pair of adjacent weigh platform modules. The coupling elements are designed for mating contact and include fastener assembly receiving cavity sections that, when the coupling elements are properly mated, form a fastener assembly receiving cavity in an exposed top surface of the coupling device. A fastener assembly is located in the fastener assembly receiving cavity and is operative to secure the mated arrangement of the coupling elements, thereby rigidly connecting the associated weigh platform modules. The accessible location of the fastener assembly facilitates both installation and subsequent service/repair procedures.

20 Claims, 8 Drawing Sheets

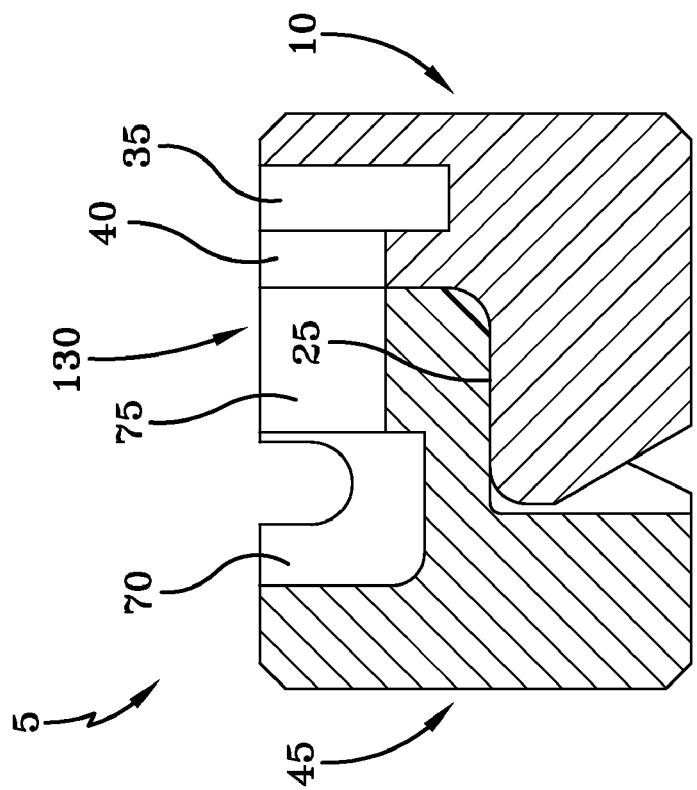
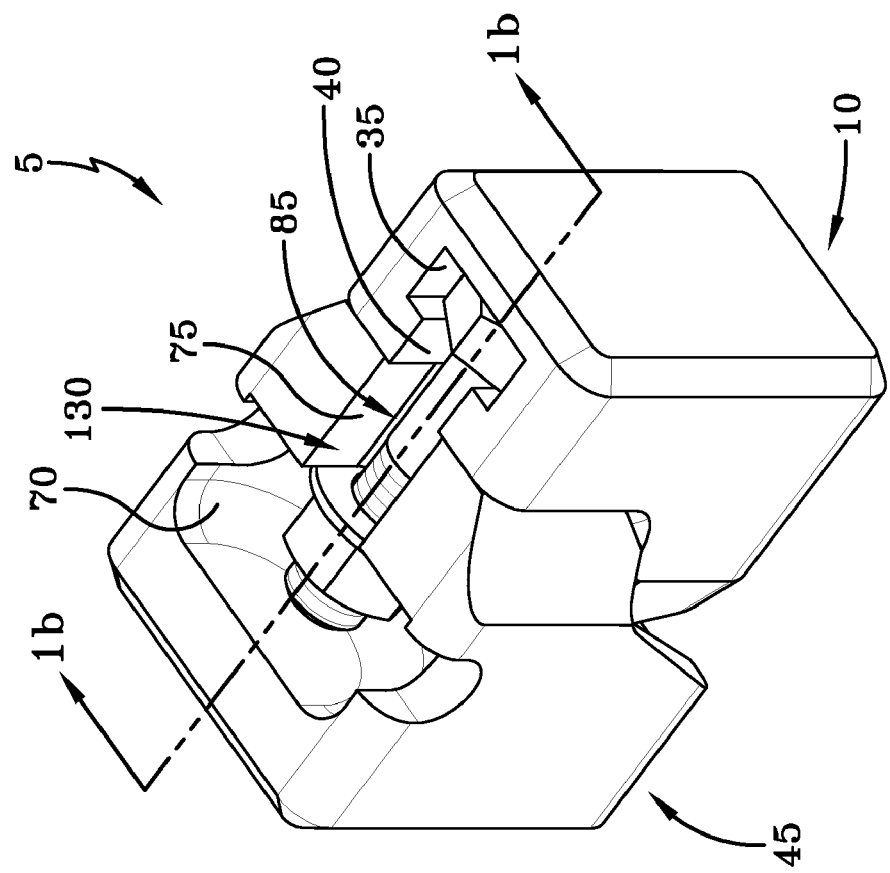

VEHICLE SCALE COUPLING DEVICE

BACKGROUND OF THE INVENTIVE FIELD

The present invention is directed to a coupling device for joining sections of a vehicle scale. More particularly, the present invention is directed to a cost effective coupling device for joining adjacent weigh platform modules of a vehicle scale, wherein installation and subsequent servicing of said coupling device are facilitated by its design.

A typical vehicle scale includes at least one weigh platform (or deck) for receiving a vehicle to be weighed. The weigh platform may be comprised of a metal framework with a steel plate deck, or the weigh platform may be comprised of concrete (typically enclosed within a steel frame). The weigh platform may be supported from beneath by a number of weighing elements, such as load cells, mechanical or hydraulic sensors, etc. When a vehicle is placed on the weigh platform, each weighing element produces an output signal that reflects the portion of the vehicle weight borne by that load cell. The signals from the load cells are added to produce an indication of the total weight of the vehicle residing on the weigh platform.

Vehicle scales, and their associated weigh platforms, can be of various size. For example, such vehicle scales are commonly of a size that is sufficient to accommodate a semi-truck trailer. Vehicle scales of such size are typically assembled using multiple weigh platform segments (modules) that are connected end-to-end to provide a full-length weigh platform.

The connection of weigh platform modules in such an end-to-end arrangement generally requires the use of couplers, numerous ones of which have been employed in the art. However, these known weigh platform couplers and coupling techniques suffer from various deficiencies. For example, known weigh platform couplers are typically difficult to install. Such known weigh platform couplers may also be difficult to service after installation, possibly requiring coupler and/or platform disassembly to perform such service. Further, known weigh platform couplers and coupling techniques do not typically permit easy correction of weigh platform misalignment.

The present invention is directed to a weigh platform coupling device and coupling method that overcomes these deficiencies. A weigh platform coupling device of the present invention and its associated method of joining weigh platform modules is cost effective, provides for simple installation and service, and results in an overall weigh platform that is structurally sound.

SUMMARY OF THE GENERAL INVENTIVE CONCEPT

A vehicle scale weigh platform coupling device of the present invention may be used to easily and effectively couple adjacent weigh platform modules. Once installed, the coupling device may be easily serviced if needed, such as when changing a corroded or defective fastener, or to account for module misalignment.

A vehicle scale weigh platform coupling device of the present invention is comprised of a mating pair of coupling elements, one element of each coupling device adapted for attachment to a face of an opposite one of adjacent weigh platform modules. The coupling elements of a coupling device of the present invention have a complimentary geometry, with one element designed to rest atop the other when the device is assembled.

Each coupling element also includes a fastener assembly receiving cavity section that forms a complete fastener assembly receiving cavity along a top face of the coupling device after the individual coupling elements are attached to respective weigh platform modules and placed in mating contact. A fastener assembly (e.g., a bolt/washer/nut assembly) is placed in the fastener assembly receiving cavity so as to secure the mated arrangement of the coupling elements, thereby rigidly connecting the associated weigh platform modules.

The coupling elements of a coupling device of the present invention may be affixed to associated weigh platform modules by a variety of methods including, without limitation, by means of one or more threaded fasteners or by welding. Typically, but not necessarily, a pair of coupling devices reside between an adjacent pair of weigh platform modules.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1a is a perspective view of an exemplary embodiment of an assembled coupling device of the present invention;

FIG. 1b is a cross-sectional side elevation view of a pair of assembled coupling elements of the coupling device of FIG. 1a (shown without the fastener), taken along line 1b-1b of FIG. 1a;

FIG. 2b is a top plan view of the coupling element of FIG. 2a;

FIG. 2d is a bottom plan view of the coupling element of FIG. 2a;

FIG. 3b is a top plan view of the coupling element of FIG. 3a;

FIG. 3d is a bottom plan view of the coupling element of FIG. 3a;

DETAILED DESCRIPTION OF EXEMPLARY EMBODIMENT(S)

Figure 2B:
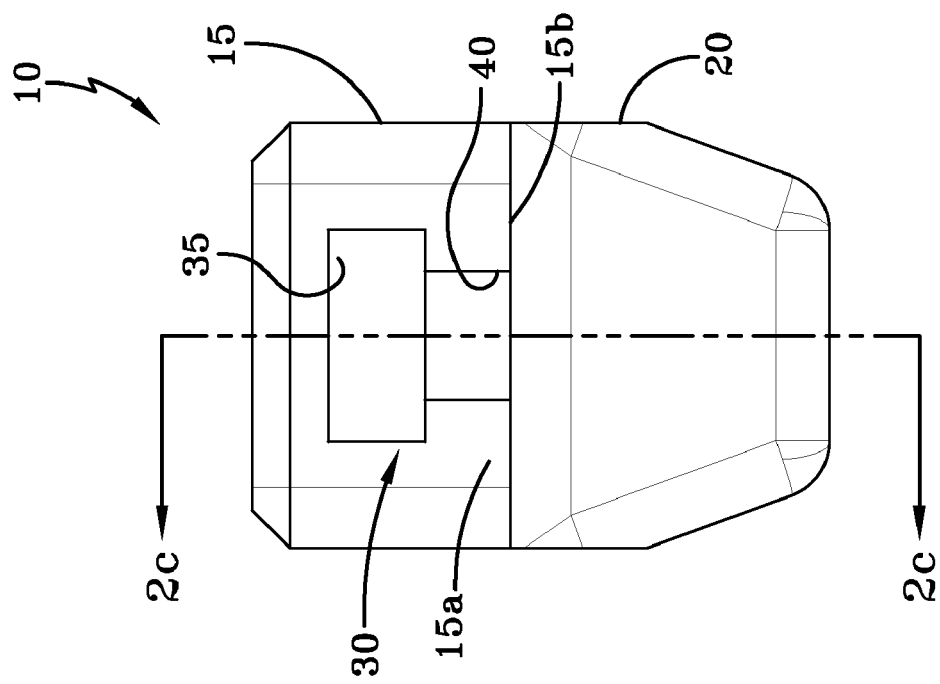
Figure 2A:
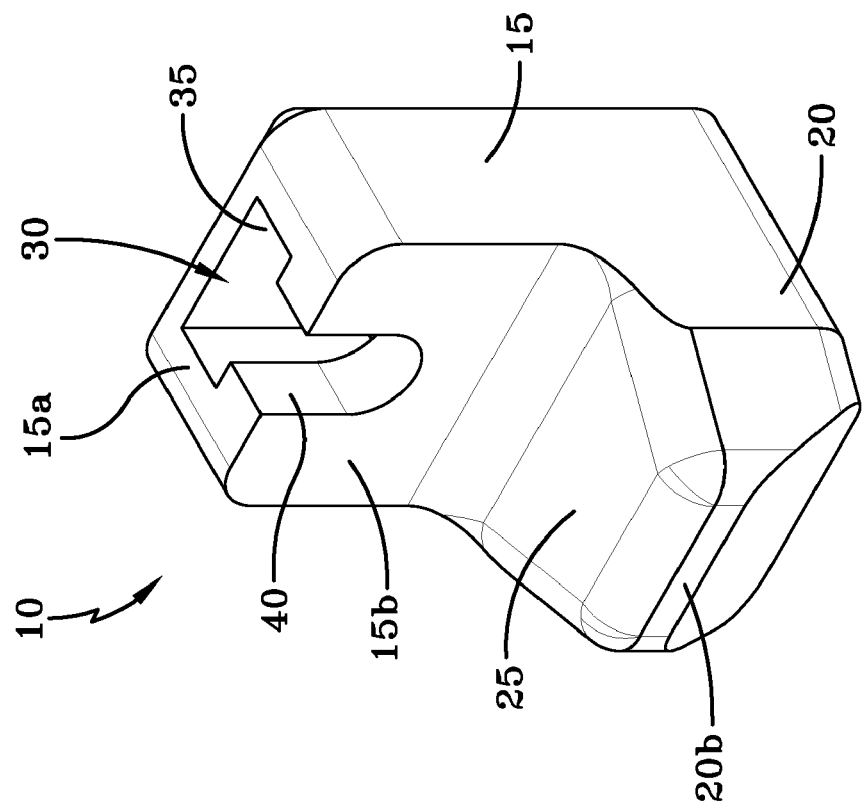
FIG. 2a is a perspective view of a first coupling element of the exemplary coupling device of FIGS. 1a-1b.
Figure 2D:
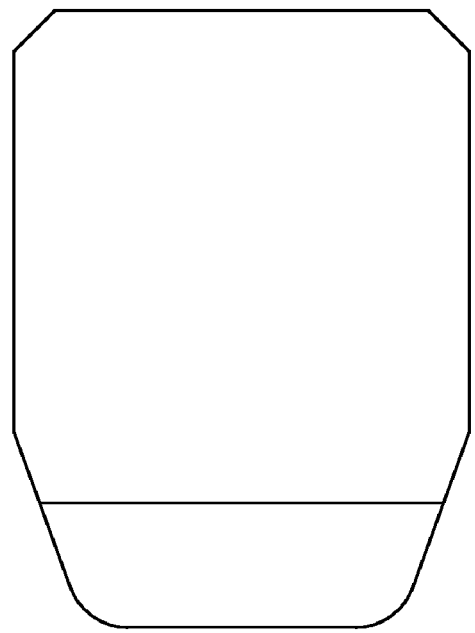
Figure 2C:
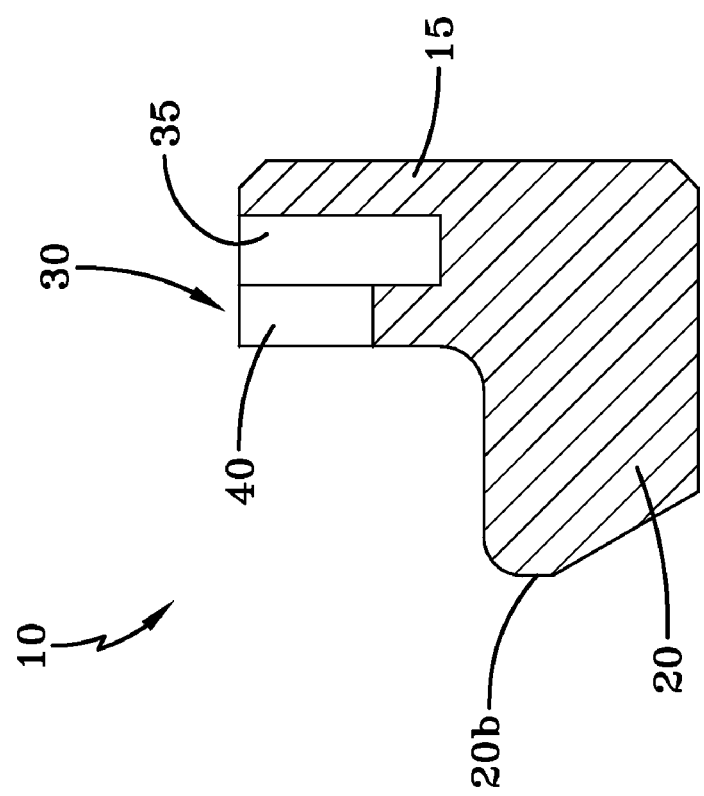
FIG. 2c is a cross-sectional side elevation view of the coupling element of FIG. 2a taken along line 2c-2c of FIG. 2b.
Figure 3B:
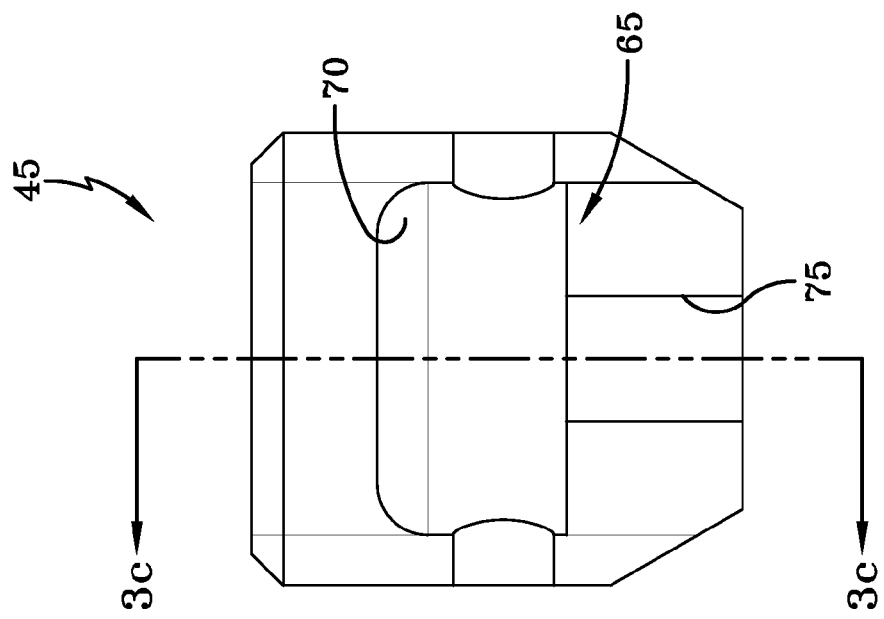
Figure 3A:
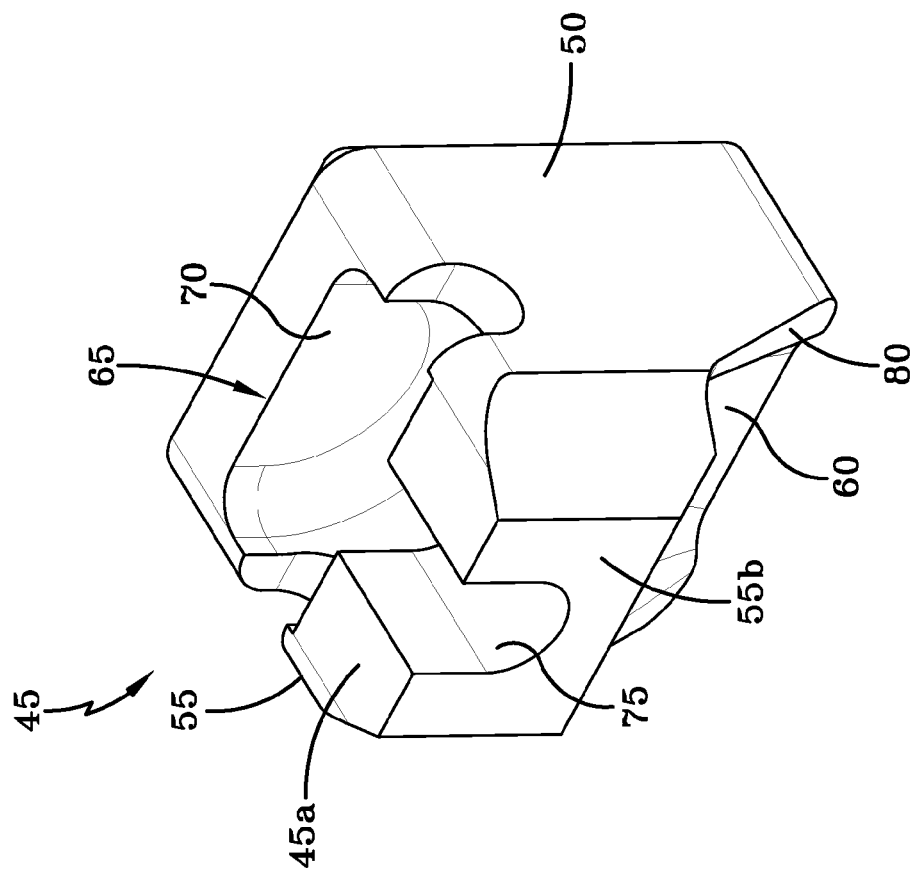
FIG. 3a is a perspective view of a second coupling element of the exemplary coupling device of FIGS. 1a-1b.
Figure 3D:
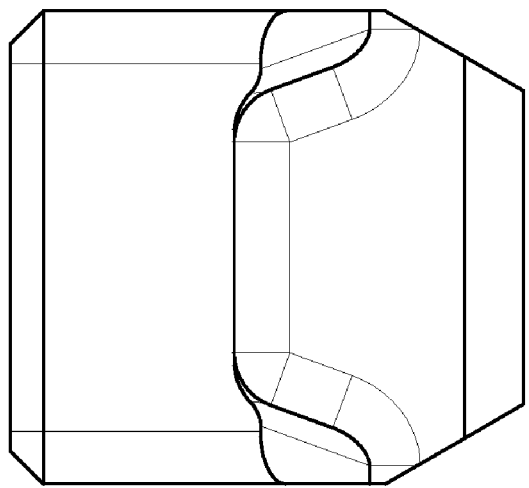
Figure 3C:
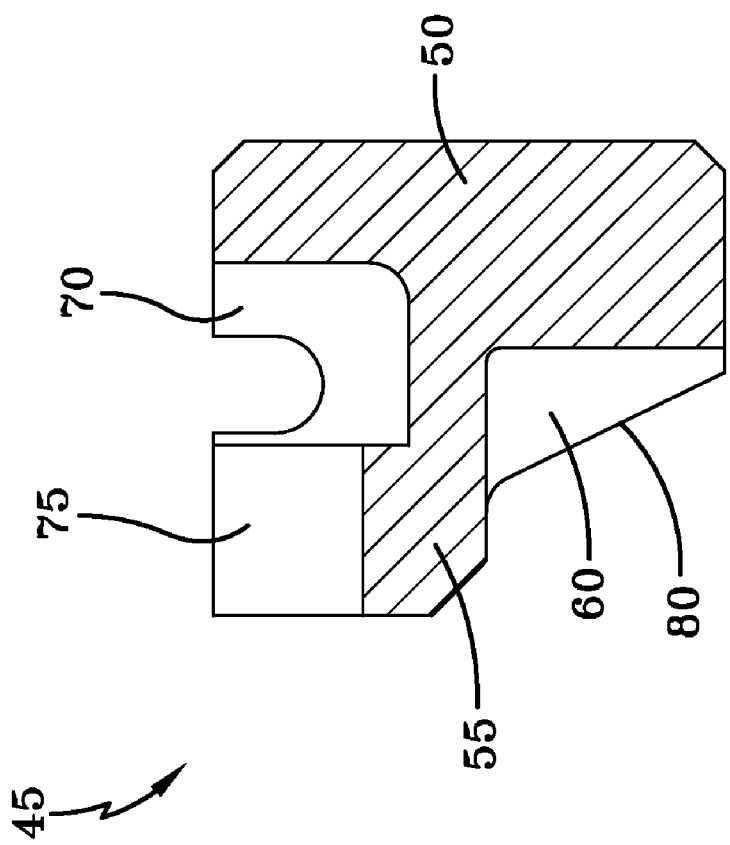
FIG. 3c is a cross-sectional side elevation view of the coupling element of FIG. 3a taken along line 3c-3c of FIG. 3b.

One exemplary embodiment of an assembled vehicle scale weigh platform coupling device 5 (coupling device) is depicted in FIGS. 1a-1b. As shown the coupling device 5 is actually comprised of a pair of corresponding coupling elements 10, 45, which are secured to one another by means of a fastener assembly 85. Various views of each coupling element 10, 45 may be observed in FIGS. 2a-3d. Installation of the coupling device 5 between adjacent vehicle scale weigh platforms can be observed in FIG. 6.

Referring to FIGS. 2a-2d, a first coupling element 10 of the exemplary coupling element pair can be viewed. As used in this respect, the term "first" is intended only as an identifier, and is not to be construed as indicative of any preference, order, location, etc., with respect to this coupling element 10. As most clearly shown in FIG. 2c, the first coupling element 10 is substantially L-shaped in cross-section.

A vertical leg 15 of the first coupling element 10 is provided for mounting the first coupling element to an associated vehicle scale weigh platform module (weigh platform module). As mentioned previously, a preferred method of mounting a coupling element 10, 45 of the present invention to an associated vehicle scale weigh platform module, is welding. However, as would be apparent to one of skill in the art, a coupling element of the present invention could be easily modified for mounting using a threaded fastener.

A horizontal leg 20 of the first coupling element 10 acts as a support with respect to the second coupling element 45. More specifically, and as shown most clearly in FIG. 1b, at least a portion of a top surface 25 of the horizontal leg 20 acts as a seat upon which an underside of the second coupling element 45 rests when the coupling elements are placed in engagement so as to form the coupling device 5.

In order to facilitate this resting engagement between the first coupling element 10 and the second coupling element 45, a distal end 20b of the horizontal leg 20 may be rounded and/or chamfered so as to facilitate entry of at least a portion thereof into a receiving pocket 60 of the second coupling element 45 when the coupling elements are engaged. Contrarily, the distal end 20b of the horizontal leg 20 may be substantially square in other embodiments of the present invention.

A fastener assembly receiving cavity section 30 extends into the vertical leg 15 from a top face 15a thereof. The fastener assembly receiving cavity section 30 is shown to include a fastener head retention slot 35 having a fastener body passage slot 40 extending therefrom through a front face 15b of the vertical leg 15. The combination of the fastener head retention slot 35 and the fastener body passage slot 40 effectively causes the fastener assembly receiving cavity section 30 to act like a partial keyhole slot, which hinders removal of a fastener from the fastener assembly receiving cavity section and assists with the fastener tightening process (as is described in more detail below).

A complementary second coupling element 45 of the exemplary coupling element pair is depicted in FIGS. 3a-3d. As used in this respect, the term "second" is intended only as an identifier, and is not to be construed as indicative of any preference, order, location, etc., with respect to this coupling element 45. As most clearly shown in FIG. 3c, the second coupling element 45 is also substantially L-shaped in cross-section. Unlike the first coupling element 10, the second coupling element 45 also includes a pair of upwardly angled lower walls 80 that bound opposite sides of a receiving pocket 60. In comparison to the first coupling element 10, the second coupling element 45 resides in an inverted orientation when the two coupling elements are assembled to form the coupling device 5.

A vertical leg 50 of the second coupling element 45 is provided for mounting the second coupling element to an associated weigh platform module. The second coupling element 45 may be mounted to a weigh platform module by any of the techniques described herein with respect to mounting of the first coupling element 10.

A horizontal leg 55 of the second coupling element 45 is designed to rest on and be supported by the horizontal leg 20 of the first coupling element 10 when the coupling elements are assembled to form the coupling device 5. To this end, the second coupling element 45 includes a receiving pocket 60 for accommodating at least a portion of the horizontal leg 20 of the first coupling element 10 when the coupling elements are assembled to form the coupling device 5. Engagement of the horizontal leg 20 of the first coupling element 10 with the receiving pocket 60 in the second coupling element 45 helps to ensure proper alignment of the coupling elements and adds strength and stability to the assembled coupling device 5.

A fastener assembly receiving cavity section 65 extends into the top face 45a of the second coupling element 45. The fastener assembly receiving cavity section 65 is shown to include a nut retention slot 70 having a fastener body passage slot 75 extending therefrom through a front face 55b of the horizontal leg 55. In a manner similar to that of the first coupling element 10, the combination of the nut retention slot 70 and the fastener body passage slot 75 effectively causes the fastener assembly receiving cavity section 65 of the second coupling element to act like a partial keyhole slot, which hinders unintended removal of a fastener from the fastener assembly receiving cavity section and assists with the fastener tightening process (as described in more detail below).

As described above and as illustrated in the drawing figures, the first coupling element 10 contains the head retention slot 35, and the second coupling element contains the nut retention slot 70. As should be obvious to one of skill in the art, however, the location of the head retention slot 35 and the nut retention slot 70 may be reversed in other embodiments of the present invention.

The vertical location of the coupling elements 10, 45 on associated weigh platform modules is preferably selected such that the axis of each fastener assembly used to secure a mated arrangement of the coupling elements is located at or near the neutral bending axis of the weigh platform modules, thereby minimizing stress in the fastener assemblies and coupling elements. Different positioning of the coupling elements is, of course, also possible, but the resultant stresses on the fastener assemblies and coupling elements may be greater.

Figure 6:
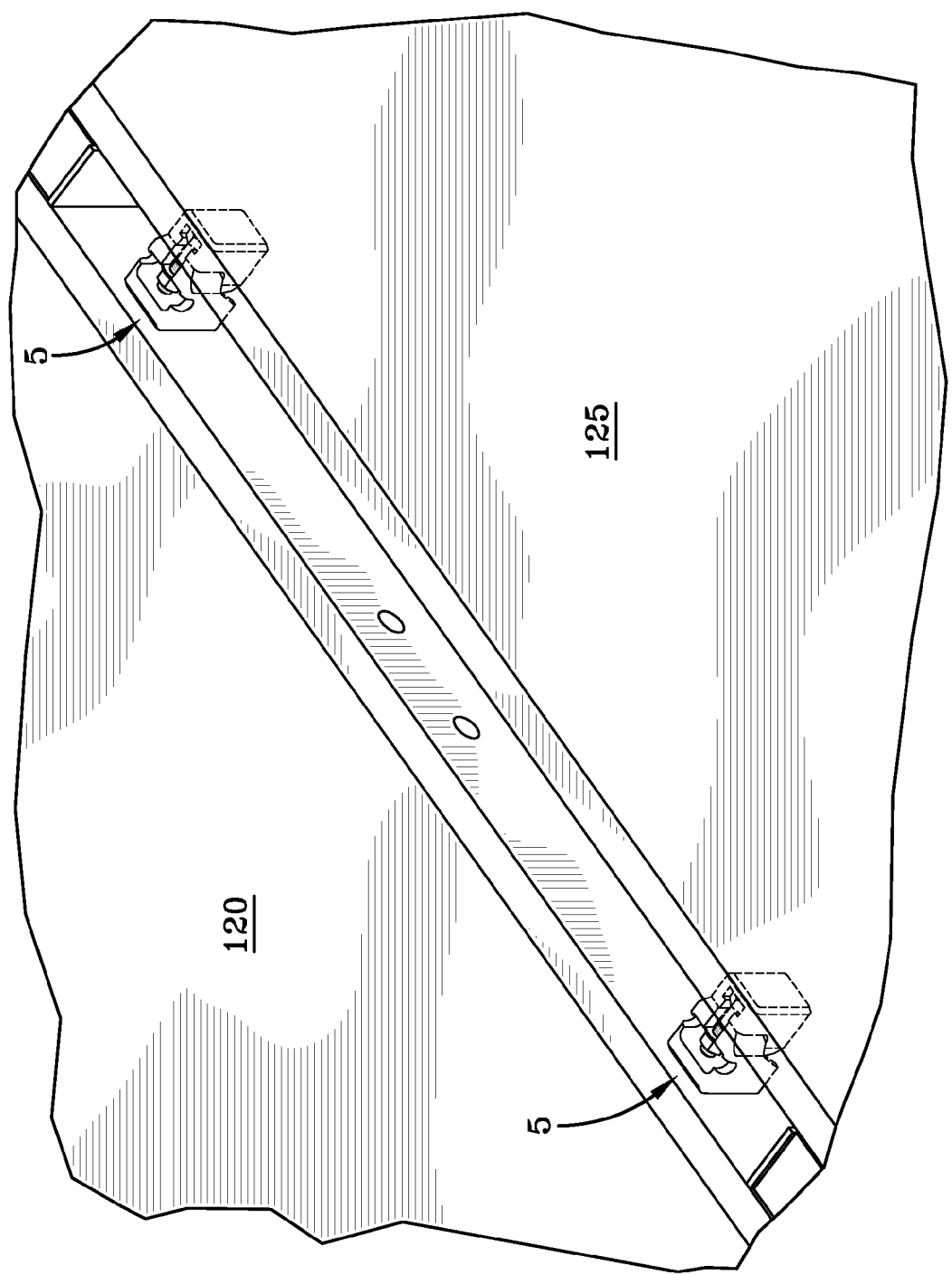
FIG. 6 is a perspective view of a pair of the exemplary coupling devices of FIG. 1 installed between adjacent weigh platforms of a vehicle scale.

As can be best observed in FIG. 1a, a fastener assembly 85 is used to secure a mated arrangement of the coupling elements 10, 45 of the coupling device 5 once the coupling elements have been affixed to respective weigh platform modules 120, 125 (see FIG. 6). Specifically, the coupling elements 10, 45 are affixed to corresponding ends of adjacent weigh platform modules 120, 125 and the weigh platform modules are aligned so that the coupling elements are placed in mated contact, as described above and shown in the drawing figures. Particularly, the horizontal leg 55 of the second coupling element 45 rests on the horizontal leg 20 of the first coupling element 10, and the horizontal leg of the first coupling element resides at least partially within the receiving pocket 60 in the second coupling element (see FIG. 2c).

With the coupling elements 10, 45 in proper mated contact, fastener assembly 85 components are placed in corresponding portions of the fastener assembly receiving cavity 130 formed by the combined fastener assembly receiving cavity sections 30, 65. Particularly, a threaded fastener 90 of the fastener assembly is placed in the fastener assembly receiving cavity such that a head portion 95 of the threaded fastener 90 resides in the head retention slot 35 of the first coupling element, and a body portion 100 of the threaded fastener extends through the fastener body passage slots 40, 75 so that a threaded end 105 thereof protrudes into the nut retention slot 70 of the second coupling element 45.

An optional washer 110 may be placed over the threaded end 105 of the fastener body portion 100. The mated arrangement of the coupling elements 10, 45 is then secured by threading a nut 115 onto the threaded end of the fastener body portion and tightening the nut. As the nut 115 is tightened, the nut (or nut and washer) presses against the wall of the nut retention slot 70 in the second coupling element 45 and the fastener head 95 presses against the wall of the head retention slot 35 in the first coupling element 10. Consequently, tightening of the nut 115 draws the front faces 15*b*, 55*b* of the coupling element vertical legs 15, 55 together (if not already in contact), secures the coupling elements into tightly-mated contact, and rigidly connects one weigh platform module to another as shown in FIG. 6.

As can be observed in the drawing figures, the fastener assembly receiving cavity 130 is formed in a top (exposed) face of the coupling elements 10, 45 (relative to their installation orientation). This allows the components of the fastener assembly 85 to be easily placed directly into the fastener assembly receiving cavity 130 from above the associated weigh platform modules 120, 125, after the coupling elements 10, 45 have been affixed thereto and the weigh platform modules are properly positioned.

Figure 4:
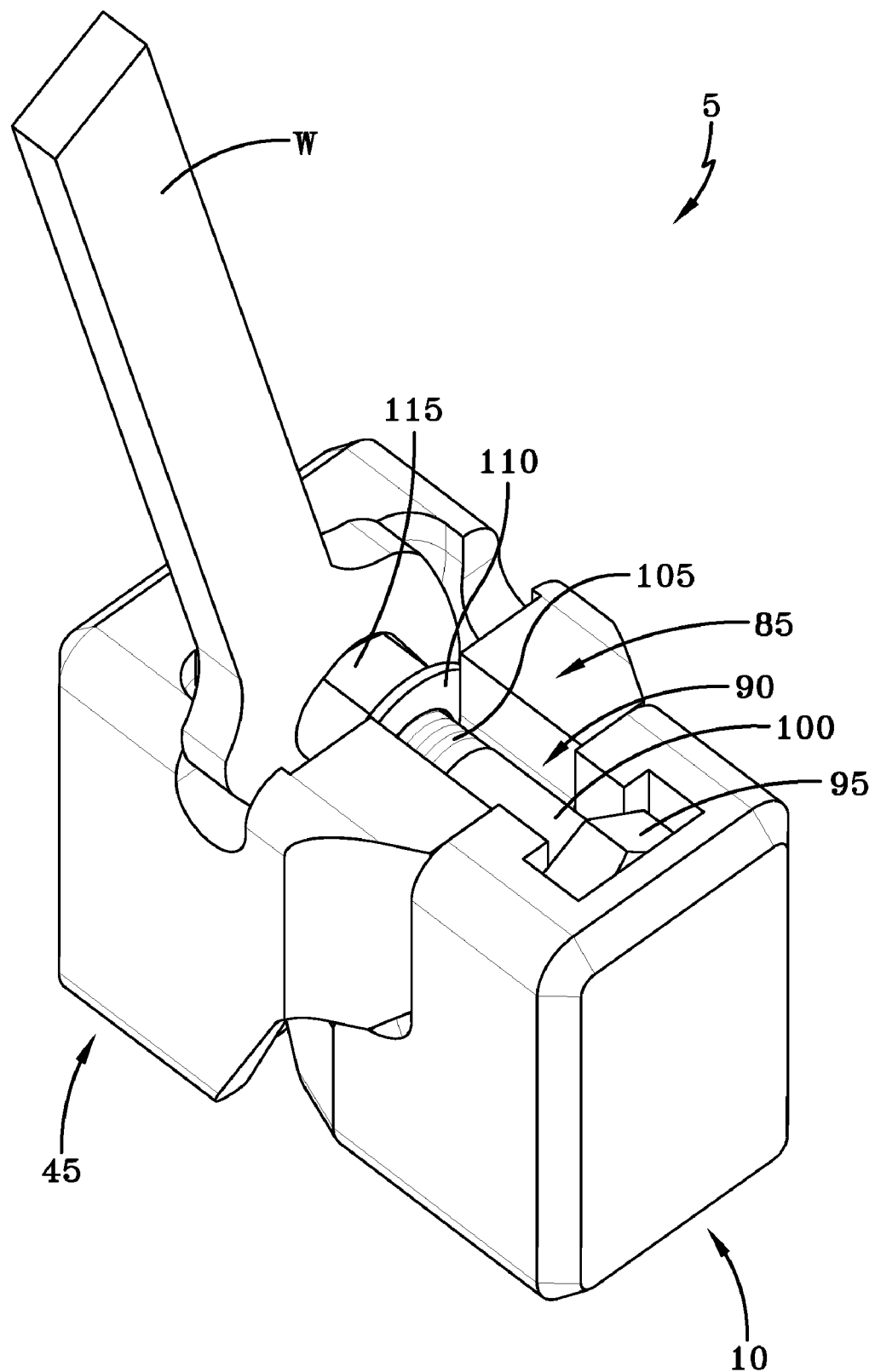
FIG. 4 illustrates how a wrench can be conveniently used to manipulate a fastener element of the coupling device of FIG. 1.

As can also be observed, the head retention slot 35 is preferably just large enough to contain the fastener head 95. Contact between the fastener head 95 and the head retention slot 35 is preferably, but not essentially, sufficient to inhibit rotation of the threaded fastener 90, which eliminates the need to engage the fastener head with a tool during a fastener assembly tightening operation. Other rotation-inhibiting features may be provided in the head retention slot 35 in addition to, or in lieu of, relying solely on the fit between the fastener head and the slot to inhibit fastener rotation. Consequently, as illustrated in FIG. 4, only one wrench W is preferably needed to tighten the fastener assembly 85. To this end, and as also illustrated in FIG. 4, the design of the nut retention slot 70 is preferably large enough to allow for sufficient rotation of a wrench W during tightening of the fastener assembly 85.

The accessibility of a fastener assembly used in the present invention also facilitates serviceability, such as may be required should a component of the fastener assembly become damaged or need to be replaced due to the presence of rust or other corrosion. In such a case, fastener assembly components can be replaced without having to disassemble an associated vehicle scale or remove any weigh platform modules.

Figure 5:
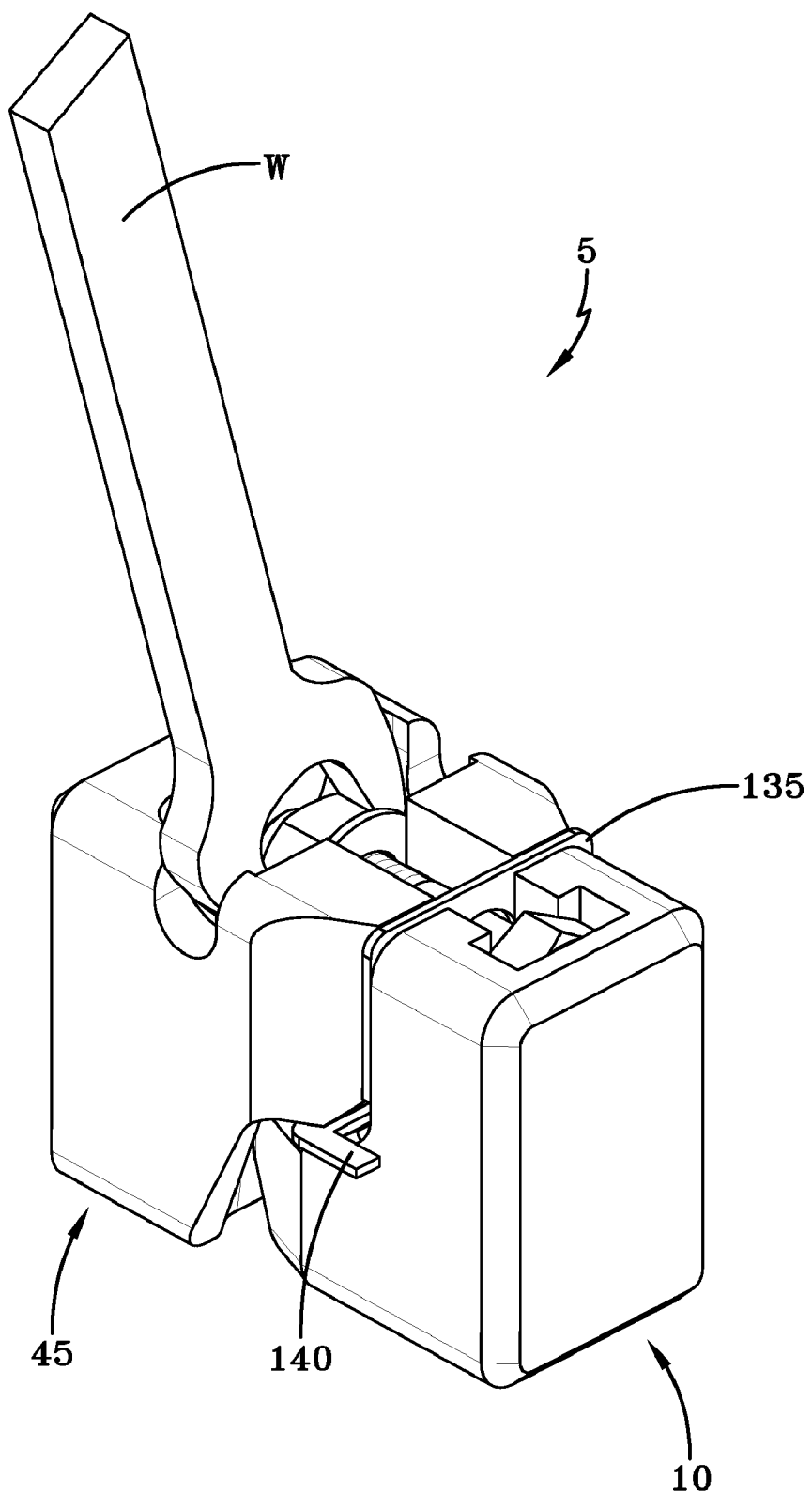
FIG. 5 illustrates the use of shims to account for vehicle scale weigh platform module misalignment.

As depicted in FIG. 5, a coupling device of the present invention may be adapted to make use of one or more adjustment shims 135, 140. A vertically oriented shim 135 may be placed between a front face 15*b* of the vertical leg 15 of the first coupling element 10 and a front face 55*b* of the horizontal leg 55 of the second coupling element 45. A horizontally oriented shim 140 may be placed between a top surface 25 of the horizontal leg 20 of the first coupling element 10 and an underside of the horizontal leg 55 of the second coupling element 45. As shown, both a horizontally oriented shim 135 and a vertically oriented shim 140 are present. However, the shims 135, 140 may also be used independently of one another, depending on the type of module adjustment required.

The shims 135, 140 can be added to (or taken away from) one or more of the coupling devices 5 attached to a weigh platform module. The use of one or more vertically oriented shims 135 allows the overall scale length to be adjusted, and also allows for the correction of misalignments between weigh platform modules. That is, by adding one or more vertically oriented shims 135 to the coupling devices 5 between adjacent weigh modules, the distance therebetween may be increased, along with the overall length of the scale. By adding one or more vertically oriented shims 135 to (or taking one or more shims away from) one coupling device at a time, associated weigh platform modules can be laterally directed to correct for such aforementioned misalignments. The use of one or more horizontally oriented shims 140 allows the deck height of a weigh platform module to be adjusted, and may also allow for longitudinal and lateral slope correction by adding one or more vertically oriented shims to (or taking one or more shims away from) one coupling device, or an associated pair of coupling devices, at a time.

The coupling elements of a coupling device of the present invention may be manufactured by a number of techniques. For example, it has been found that casting the coupling elements is cost effective, particularly in larger volumes. Further, casting the coupling elements allows for the relatively easy creation of complex geometries that may be required to accommodate a fastener assembly, provide for wrench clearance, etc. It is also possible to machine the coupling elements, although machining may be more time consuming and expensive, particularly if large quantities of coupling elements are required. Nonetheless, while casting of such coupling elements may have certain advantages, coupling elements of the present invention are in no way limited to manufacture by a casting process.

A particular exemplary embodiment of a vehicle scale weigh platform coupling device is shown and described herein for purposes of illustration. However, nothing herein is to be interpreted as limiting the present invention to the exact embodiment shown, as it would be apparent to one of skill in the art that various changes may be made thereto while still practicing the invention. Therefore, the scope of the present invention is not to be considered limited by the disclosure of said exemplary embodiment, and modifications thereof are possible without departing from the spirit of the invention as evidenced by the following claims:

What is claimed is:

1. A vehicle scale weigh platform coupling device, comprising:
   a first coupling element having a vertical leg for attachment to an associated vehicle scale weigh platform module, and a horizontal leg adapted to support a second coupling element;
   a second coupling element having a vertical leg for attachment to an associated vehicle scale weigh platform module and a horizontal leg adapted to rest on said horizontal leg of said first coupling element;
   a fastener assembly receiving cavity section located in a top face of each of said first and second coupling elements, said fastener assembly receiving cavity sections forming a fastener assembly receiving cavity when said first and second coupling elements are properly mated; and
   a fastener assembly located in said fastener assembly receiving cavity, said fastener assembly operative to secure a mated arrangement of said first and second coupling elements such that said associated vehicle scale weigh platform modules are rigidly connected.

2. The vehicle scale weigh platform coupling device of claim 1, wherein said first and second coupling elements are affixed to respective vehicle scale weigh platform modules by welding.

3. The vehicle scale weigh platform coupling device of claim 1, further comprising a receiving pocket in said second coupling element, said receiving pocket accommodating at least a portion of said horizontal leg of said first coupling element when said coupling elements are mated.

4. The vehicle scale weigh platform coupling device of claim 1, wherein said fastener assembly includes a threaded fastener and a like-threaded nut.

5. The vehicle scale weigh platform coupling device of claim 4, wherein said fastener assembly receiving cavity includes a head retention slot for receiving a head of said threaded fastener, a nut retention slot for receiving said nut, and a fastener body passage slot for receiving a body of said threaded fastener, said fastener body passage slot connecting said head retention slot and said nut retention slot.

6. The vehicle scale weigh platform coupling device of claim 5, wherein said head retention slot is located in said first coupling element and said nut retention slot is located in said second coupling element.

7. The vehicle scale weigh platform coupling device of claim 5, wherein a threaded end of said threaded fastener protrudes into said nut retention slot, where it is threadedly-engaged by said nut.

8. The vehicle scale weigh platform coupling device of claim 5, wherein said head retention slot receives said head of said threaded fastener in a manner that substantially prevents rotation of said threaded fastener during a fastener assembly tightening operation.

9. The vehicle scale weigh platform coupling device of claim 5, wherein said nut retention slot is of sufficient size to permit in situ rotation of said nut by a wrench.

10. The vehicle scale weigh platform coupling device of claim 1, wherein corresponding faces of said vertical legs of said first and second coupling elements are placed in abutting contact when said first and second coupling elements are properly mated.

11. A vehicle scale weigh platform coupling device, comprising:
a first coupling element having a vertical leg for attachment to an associated one of an adjacent pair of vehicle scale weigh platform modules, and a horizontal leg adapted to support a second coupling element;
a corresponding second coupling element having a vertical leg for attachment to an associated one of an adjacent pair of vehicle scale weigh platform modules, a horizontal leg adapted to rest on said horizontal leg of said first coupling element, and a receiving pocket in said second coupling element for accommodating at least a portion of said horizontal leg of said first coupling element when said coupling elements are mated;
a fastener assembly receiving cavity section located in a top face of each of said first and second coupling elements so as to form a fastener assembly receiving cavity in said coupling device when said first and second coupling elements are properly mated, said fastener assembly receiving cavity including a head retention slot for receiving a head of a threaded fastener, a nut retention slot for receiving a nut, and a fastener body passage slot connecting said head retention slot and said nut retention and adapted to receive a body portion of said threaded fastener, said fastener assembly receiving cavity accessible from above said vehicle scale weigh platform modules when said coupling device is located therebetween; and
a fastener assembly located in said fastener assembly receiving cavity, said fastener assembly operative to secure a mated arrangement of said first and second coupling elements such that said adjacent vehicle scale weigh platform modules are rigidly connected.

12. The vehicle scale weigh platform coupling device of claim 11, wherein said fastener assembly includes a threaded fastener and a like-threaded nut, a threaded end of said threaded fastener protruding into said nut retention slot and threadedly-engaged by said nut.

13. The vehicle scale weigh platform coupling device of claim 11, wherein said head retention slot is located in said first coupling element and said nut retention slot is located in said second coupling element.

14. The vehicle scale weigh platform coupling device of claim 11, wherein said head retention slot receives a head of said threaded fastener in a manner that substantially prevents rotation of said threaded fastener during a fastener assembly tightening operation.

15. The vehicle scale weigh platform coupling device of claim 11, wherein said nut retention slot is of sufficient size to permit rotation of said nut by a wrench while said nut resides in said slot.

16. The vehicle scale weigh platform coupling device of claim 11, wherein corresponding faces of said vertical legs of said first and second coupling elements are placed in abutting contact when said first and second coupling elements are properly mated.

17. A method of coupling adjacent vehicle scale weigh platform modules, comprising:
attaching a first coupling element, by a vertical leg thereof, to one of said adjacent pair of vehicle scale weigh platform modules, said first coupling element further including a horizontal leg adapted to support a second coupling element;
attaching a corresponding second coupling element, by a vertical leg thereof, to the other of said adjacent pair of vehicle scale weigh platform modules, said second coupling element further including a horizontal leg adapted to rest on said horizontal leg of said first coupling element;
providing a fastener assembly receiving cavity section in a top face of each of said first and second coupling elements so as to form a fastener assembly receiving cavity in said coupling device when said first and second coupling elements are properly mated, said fastener assembly receiving cavity including a head retention slot for receiving a head of a threaded fastener, a nut retention slot for receiving a nut, and a fastener body passage slot connecting said head retention slot and said nut retention slot and adapted to receive a body portion of said threaded fastener, said fastener assembly receiving cavity accessible from above said vehicle scale weigh platform modules when said coupling device is located therebetween;
positioning said vehicle scale weigh platform modules so that said first and second coupling elements are placed into mating contact;
installing a fastener assembly in said fastener assembly receiving cavity, said fastener assembly including at least a threaded fastener and a like-threaded nut; and
tightening said nut onto said threaded fastener while said nut resides in said nut retention slot, thereby securing a mated arrangement of said first and second coupling elements and rigidly connecting said adjacent vehicle scale weigh platform modules.

18. The method of claim 17, further comprising locating a receiving pocket in said second coupling element, said receiving pocket accommodating at least a portion of said horizontal leg of said first coupling element when said coupling elements are mated.

19. The method of claim 17, wherein said head retention slot of said fastener assembly receiving cavity is designed to receive a head of said threaded fastener in a manner that substantially prevents rotation of said threaded fastener during tightening of said nut.

20. The method of claim 19, wherein said nut retention slot is of sufficient size to permit in situ rotation of said nut by a wrench.

* * * * *